United States Patent [19]

Drexler

[11] Patent Number: 4,588,665

[45] Date of Patent: * May 13, 1986

[54] MICROGRAPHIC FILM MEMBER WITH LASER WRITTEN DATA

[75] Inventor: Jerome Drexler, Los Altos Hills, Calif.

[73] Assignee: Drexler Technology Corporation, Mountain View, Calif.

[*] Notice: The portion of the term of this patent subsequent to Mar. 5, 2002 has been disclaimed.

[21] Appl. No.: 693,855

[22] Filed: Jan. 22, 1985

Related U.S. Application Data

[63] Continuation-in-part of Ser. No. 443,596, Nov. 22, 1982, Pat. No. 4,503,135, which is a continuation-in-part of Ser. No. 238,832, Feb. 27, 1981, Pat. No. 4,360,728, and a continuation-in-part of Ser. No. 238,833, Feb. 27, 1981, abandoned.

[51] Int. Cl.[4] .......................... G03C 3/00; G03C 5/14
[52] U.S. Cl. ........................................ 430/12; 430/15; 430/140; 430/496; 430/945; 346/76 L; 346/135.1; 369/273
[58] Field of Search ............... 430/12, 15, 140, 496, 430/945; 346/76 L, 135.1; 369/265, 273, 275; 365/215

[56] References Cited

U.S. PATENT DOCUMENTS

| | | | |
|---|---|---|---|
| 4,110,020 | 8/1978 | Johnson et al. | 353/26 A |
| 4,230,939 | 10/1980 | de Bont et al. | 235/488 |
| 4,254,329 | 3/1981 | Gokey et al. | 235/379 |
| 4,278,756 | 7/1981 | Bouldin et al. | 430/414 |
| 4,312,938 | 1/1982 | Drexler et al. | 430/496 |
| 4,324,484 | 4/1982 | Johnson | 355/5 |
| 4,343,879 | 8/1982 | Drexler et al. | 430/14 |
| 4,503,135 | 3/1985 | Drexler | 430/12 |

FOREIGN PATENT DOCUMENTS

| | | |
|---|---|---|
| 1472622 | 5/1977 | United Kingdom . |
| 2036369A | 12/1978 | United Kingdom . |
| 2044175A | 10/1980 | United Kingdom . |

OTHER PUBLICATIONS

Manuel, "Optical Disk Stores Images and Data for Rapid Retrieval", *Electronics,* Oct. 20, 1982, p. 47.

Primary Examiner—John Kittle
Assistant Examiner—José G. Dees

[57] ABSTRACT

A micrographic film member has a micrographic image and borders surrounding the image. A strip of laser recording material is disposed on a border. Laser written indicia related to the micrographic image is recorded on this strip. The information may include indexing information, information for controlling an optical micrographic reader, and information relating to the position or sequencing of image portions within the micrographic image. The indicia may be machine readable, eye readable alphanumerics or laser written speech. The speech can be either digitized human speech or artificial speech such as phoneme speech.

10 Claims, 8 Drawing Figures

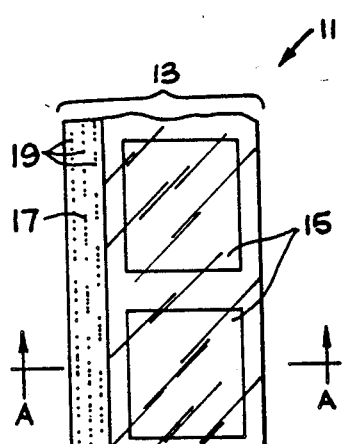
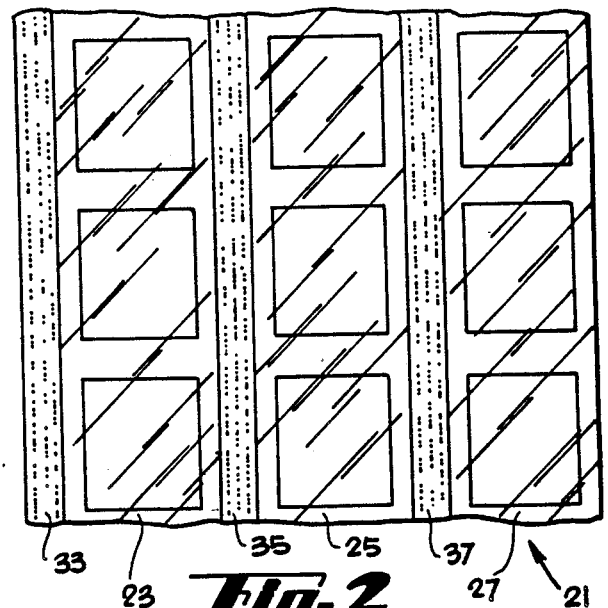
Fig. 1  Fig. 2
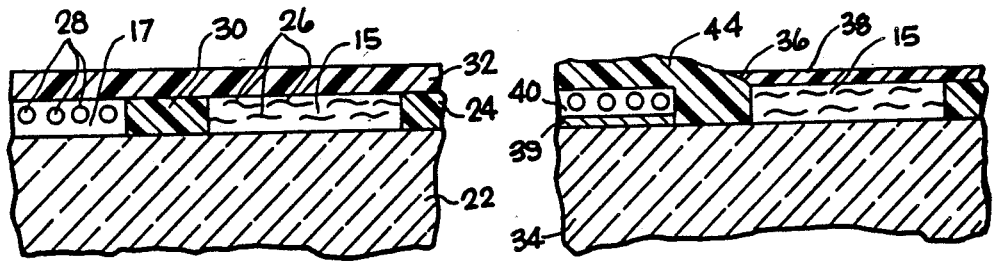
Fig. 3  Fig. 4
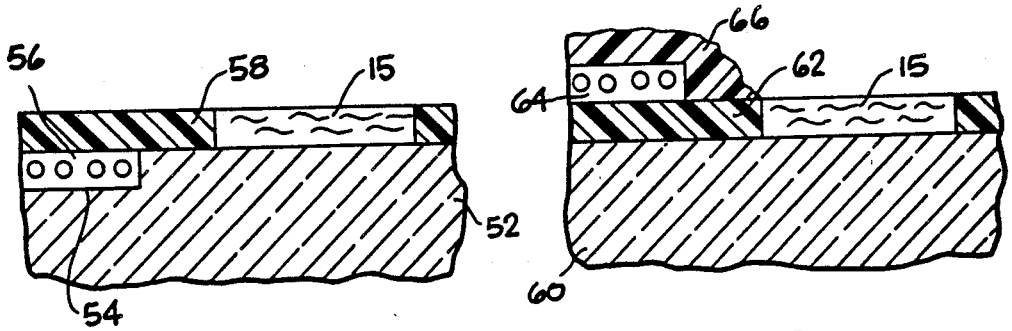
Fig. 5  Fig. 6

MICROGRAPHIC FILM MEMBER WITH LASER WRITTEN DATA

DESCRIPTION

CROSS REFERENCE TO RELATED APPLICATION

This is a continuation-in-part of patent application Ser. No. 443,596 filed Nov. 22, 1982, U.S. Pat. No. 4,503,135 which is a continuation-in-part of patent application Ser. No. 238,832 filed Feb. 27, 1981, now U.S. Pat. No. 4,360,728, granted Nov. 23, 1982, and patent application Ser. No. 238,833, filed Feb. 27, 1981, abandoned.

TECHNICAL FIELD

The invention relates to optical data recording media and more particularly to microfilm and microfiche containing both photographic images and laser recorded direct-read-after-write (DRAW) reflective read data.

BACKGROUND ART

In U.S. Pat. No. 4,110,020, Johnson et al. discloses an electronically controlled microfilm reader. A roll of microfilm has images in separate photographic areas, each area being arranged in a microfiche-type format. A bar code is printed along the edge of the film. The electronic control system of the reader positions the selected image area for viewing by using the bar code. U.S. Pat. No. 4,324,484 to Johnson discloses a microfilm system that records a document on microfilm and records a bar code adjacent the image.

In U.S. Pat. No. 4,254,329, Gokey et al. teach a microfiche information retrieval and control system. The microfiche has rows of digital information and addresses for the rows. An optical sensor reads the digital information which is then displayed on a screen. The sensor is aligned with the selected row when the row address is put into the system.

A mass data storage disc for images and data is described in Electronics, Oct. 20, 1982, p. 47. A plastic disc is stamped out from a glass master on which microminiature copies of catalog pages and interspersed bar code digital data are recorded on photoresist in concentric rings. The microphotograph on the disc is apparently read by optically scanning the rings, forming a serial data stream, until the image is re-created, line by line. The image is then magnified and displayed on a screen.

In the field of archival data storage, it is frequently necessary to store audio-visual information. Adding digital information by means of a smaller laser recorder could be of considerable value for stored microfiche and microfilm. Such add-on records have a potential of getting separated from the recorded film during storage. Even if not seperated, the differences in archival storage properties, say between film and paper, pose storage problems.

An object of the invention is to provide a means of recording directly on microfilm or microfiche, both a visual display and data to accompany that image either prior to, during, or after exposure forming such image.

DISCLOSURE OF THE INVENTION

The above objects have been met with a micrographic film having, on at least one edge, a strip of laser recordable, material. The film could be either unexposed or exposed film in sheet or roll configuration. A laser beam records data on the strip of recordable material either by ablation, melting, physical or chemical changes, or by deformation thereby producing spots representing changes in reflectivity detectable by a light detector. In this manner, data concerning the visual image may be recorded and read directly from the strip. The strip may contain prerecorded data, concurrently recorded data or data recorded after exposure of the photosensitive film portion of the medium.

Descriptive, analytical or interpretative data may be integrated with the picture record and both stored together. The data may include indexing information, information for controlling an optical micrographic reader, information relating to position or sequencing of image portions within the micrographic image. It may be eye readable alphanumeric information or machine readable information. Human speech may be digitized and written on the laser recording strip. Alternatively, strings of phoneme codes, representing words in phoneme speech, may be recorded.

No processing after laser recording is required for the recording strip when it is a direct-read-after-write material. Laser recording materials may also be used that requrie heat processing after laser recording. The uniform surface reflectivity of this strip before recording typicaly would range between 8% and 65%. Laser recording may create either low reflectivity spots in a reflective field or high reflective spots in a low reflectivity field. The average reflectivity over a laser recorded hole might be in the range of 5% to 25% in a high reflective field and be in the range of 40% to 50% in a low reflective field. Thus, the reflective contrast ratio of the recorded spots would range between 2:1 and 7:1. Photographic pre-formatting would create spots having a 10% reflectivity in a high reflective field or 40% in a low reflective field.

Processing of the exposed silver halide emulsion does not affect the recordability of the strip. If the substrate used is transparent, the recorded data may also be read by light transmission through recorded holes.

An advantage of the invention is that laser recorded data will not be seperated from corresponding image data and both will have similar archival properties.

BRIEF DESCRIPTION OF THE DRAWINGS

FIG. 1 is a top view of a first embodiment of the recording medium of the present invention.

FIG. 2 is a top view of the second embodiment of the present invention.

FIGS. 3-6 are alternate sectional constructions of the medium of FIG. 1 taken along lines A—A in FIG. 1.

BEST MODE FOR CARRYING OUT THE INVENTION

Figure 7:
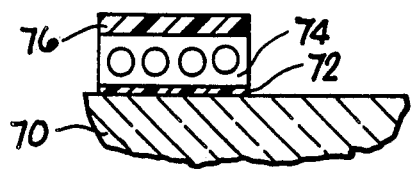
FIG. 7 is a partial sectional view of an alternate embodiment of the medium of FIG. 1.

With reference to FIG. 1, the recording medium of the present invention may be seen to comprise a photosensitive micrographic medium 11 having a planar major surface 13 which is divided into a micrographic image area 15 and a data strip 17. Micrographic medium 11 is preferably photographic film in sheet form, for example microfiche film, or in roll form. The micrographic image areas 15 are conventional micrographic images, produced by usual micrographic techniques, typically by exposure and development of the film. The image areas 15 may occupy the entirety of the film, except for the data strip, or discrete areas shown in FIG. 1. The discrete areas may resemble roll film or microfiche film, where several images are disposed on a unitary film member. Alternatively, only a single image may be on the film.

The present invention features an optical data strip 17 which may be a direct read-after-write (DRAW) material which may have either pre-recorded information or user-written information, or both. The type of DRAW material that may be used is relatively highly reflective material which forms a shiny field against pits, craters or spots in the reflective surface which tend to be absorptive of light energy. The contrast differences between the low reflectivity spots and the shiny reflective field surrounding the spots cause variations at a detector when the pits are illuminated by light of lesser intensity than the light that originally created the pits. Alternatively, low reflective material which forms highly reflective spots may be used. An example of the latter type is described in U.S. Pat. No. 4,343,879.

Data strip 17 is intended to provide a data record accompanying the photographic images on the same material just as a movie sound track accompanies a sequence of frames of film. Data is written in individual tracks extending in a longitudinal direction, as indicated by the spot patterns 19 and these spot patterns are analogous to sound track on a film, except that the data tracks contain a much higher density of information and are usually read in reflection, rather than in transmission. The information density is greater because each of the spots in the spot pattern is approximately 5 microns in diameter with a spacing of about 5-10 microns between pits. The spots may be either digital, analog, or eye readable alphanumeric data, but in either case are recorded by a laser in the usual way, for example as shown in U.S. Pat. No. 4,278,756 to Bouldin, et al.

FIG. 2 is similar to FIG. 1 except that a larger micrographic medium 21 is used with a plurality of rows of images 23, 25, and 27. Accompanying each row of images is a corresponding data strip 33, 35, and 37. These data strips are analogous in construction to the strip of FIG. 1. Once again, it is not necessary that each row have individually different images. Each row may consist of either multiple images or a single image. The embodiment of FIG. 2 is a microfiche type medium where each row of images would have corresponding data on a data strip. The images are such that they can be viewed with the naked eye or with low power (magnification) optical systems. On the other hand, the data strips are not usually read with the naked eye, but require either microscopic inspection or preferably reading by reflection of a scanning laser beam as explained below. However, the laser could record eye readable alphanumerics on the laser recordable material.

FIG. 3 illustrates a first construction of the recording medium shown in FIG. 1. The sectional view includes a substrate 22 which is transparent and may be one of the many polymeric substrate materials known in the photographic arts. Applied to the substrate 22 is a subbing layer, not shown, and an emulsion layer 24. This emulsion layer has a photographic image area 15 made by exposure and development in the usual way. The wavy lines 26 represent filamentary black silver particles which characterize normal photographic black and clear images. Data strip 17 is one of many laser recording materials. For example, it could be made from, silver-halide emulsion having fine grain size, less than 0.1 microns, by a silver diffusion transfer process described in U.S. Pat. No. 4,312,938 (Drexler and Bouldin), incorporated by reference herein.

In the referenced patented process, silver-halide emulsion is exposed to a non-saturating level of actinic radiation to activate silver halide. The activated emulsion is then photographically developed to a gray color of an optical density of 0.05-2.0 to red light, forming an absorptive underlayer. There is no fixing after this first development step. The surface of the emulsion strip is then fogged by a fogging agent such as borohydride to produce silver precipitating nuclei from the part of the unexposed and undeveloped silver-halide emulsion. The strip is then contacted with a monobath containing a silver-halide solvent and a silver reducing agent to complex, transfer and reduce the remaining unexposed and undeveloped silver to reflective non-filamentary silver at the nuclei sites on the surface. The reflective layer contains from 20% to 50% silver particles of which 1% to 50% may be filamentary silver formed in the initial development step. Beneath the reflective layer is an absorptive underlayer.

The reflective surface layer is characterized by non-filamentary particles 28 overlying a concentration of filamentary particles which form the absorptive underlayer. Seperating the data strip from the image area is an unprocessed silver-halide buffer area 30 which would remain generally clear since it is neither exposed nor developed. The buffer area 30 is not necessary, but is desirable because chemical processing of data strip 17 differs from the processing of image area 15. The buffer area 30 may be fixed to remove silver halide so that the area will remain clear. This is optional. Both processes may occur by spraying of chemicals onto the surface of the film, with a mask covering buffer area 30. Such spray processing is well known in photolithography. However, in the present case it may be necessary to proceed in two steps. In the first step, conventional photographic processing of image area 26 takes palce. Subsequently, the image area, together with the buffer area 30 is masked to allow separate processing of the data strip 28. After processing is complete, a transparent layer 32 is applied to the emulsion, forming a protective layer. Layer 32 may be any of the well known protective coatings, including a layer of clear gelatin. The remainder of the film, apart from the data strip 17, need not have fine grain size. Data strip 17 can also be added to the micrographic film in the form of an adhesive tape which is bonded to the micrographic film either before or after the film is developed.

FIG. 4 is similar to FIG. 3 except that substrate 34 is coated only with silver-halide emulsion to the right of line 36. The image area 15 is exposed, developed and fixed. A protective coating 38 may then be applied. A preformed strip 40 of laser recording material may then be disposed on the substrate. This may be a strip of Drexon material. Drexon is a trademark of Drexler Technology Corporation for reflective silver based laser recording material, such as that described in the aforementioned U.S. Pat. No. 4,312,938. Such a preformed strip of laser recording material would have its own thin substrate 39 carrying the emulsion layer. Alternatively, the recording material could be any of the other direct-read-after-write laser recording materials, for example such as that described in U.S. Pat. No. 4,230,939 issued to DeBont, et al. where the patent teaches a thin metallic recording layer of reflective metal such as Bi, Te, Ind, Sn, Cu, Al, Pt, Au, Rh, As, Sb, Ge, Se, Ga. Materials which are preferred are those having high reflectivity and low melting point, particularly Cd, Sn, Tl, Ind, Bi and amalgams. These materials may be deposited directly on substrate 34, as by sputtering, or may be pre-manufactured on a very thin substrate and adhered to the substrate by means of a subbing layer. After adhering the laser recording material to the substrate, a transparent protective coating 44 is applied. This coating material may be the same as protective coating material 38.

With reference to FIG. 5, substrate 52 has a notch or groove 54 which allows placement of a DRAW material 56 therein. This laser recording material may be processed in situ from silver-halide material previously existing in the groove, as in the case of FIG. 3, or preexisting laser recording material of FIG. 4. In either case, the micrographic image area 15 is exposed and developed in the usual way, while an unexposed and undeveloped area 58 protects data strip 56. Since emulsion area 58 is unexposed and undeveloped, it remains clear and forms a protective layer over the data strip.

In the embodiment of FIG. 6, no groove exists in substrate 60. Rather, a micrographic image area 15 is exposed and developed in the usual way, with the remainder of the substrate being covered with emulsion which is masked and protected from exposure and development, forming a protected region 62. On top of the protected region 62 a strip of laser recording material 64 is positioned. This laser recording material may be formed in situ by application of a silver-halide emulsion strip which is then processed, as data strip 17 in FIG. 3 is processed, or may be a preformed strip which is applied as in FIG. 4. The strip is then covered with a protective coating 66.

With reference to FIG. 7, a substrate 70 is shown which carries a micrographic image in a substrate portion not shown. This image may be above the substrate surface or within the groove of the substrate, as previously mentioned. The substrate carries a secondary substrate 72 which is a thin flexible material, only a few mils thick carrying laser recording material 74. The secondary substrate 72 is adhered to the primary substrate 70 by means of an adhesive or sticky substance, similar to dry adhesive found on tape. The laser recording material may be any of the materials previously discussed, such as DREXON material, except that the secondary substrate 72 is substituted for the substrate previously mentioned. A protective coating 76 is applied over the laser recording material. Using this embodiment, photographs of the prior art may be converted to the optical data and image medium of the present invention. In this situation, not shown in the drawing of FIG. 7, a portion of an image area is converted to a nonimage area by application of the sticky laser recording material. The laser recording material rests above developed silver-halide emulsion, resembling FIG. 6, except that the emulsion is completely exposed and developed in the region underlying the secondary substrate.

In all of these embodiments, a strip of laser recording material is positioned adjacent one or more micrographic images for providing data storage of a similar quality for data as for the photo image. Remarks in the form of eye readable alphanumerics, machine readable information, digitized picture, or voice may be recorded adjacent to the micrographic image. By this means these two forms of communication will not be seperated. This arrangement is of particular value to add indexing information relating to the positioning or sequencing of image portions within the micrographic image.

Figure 8:
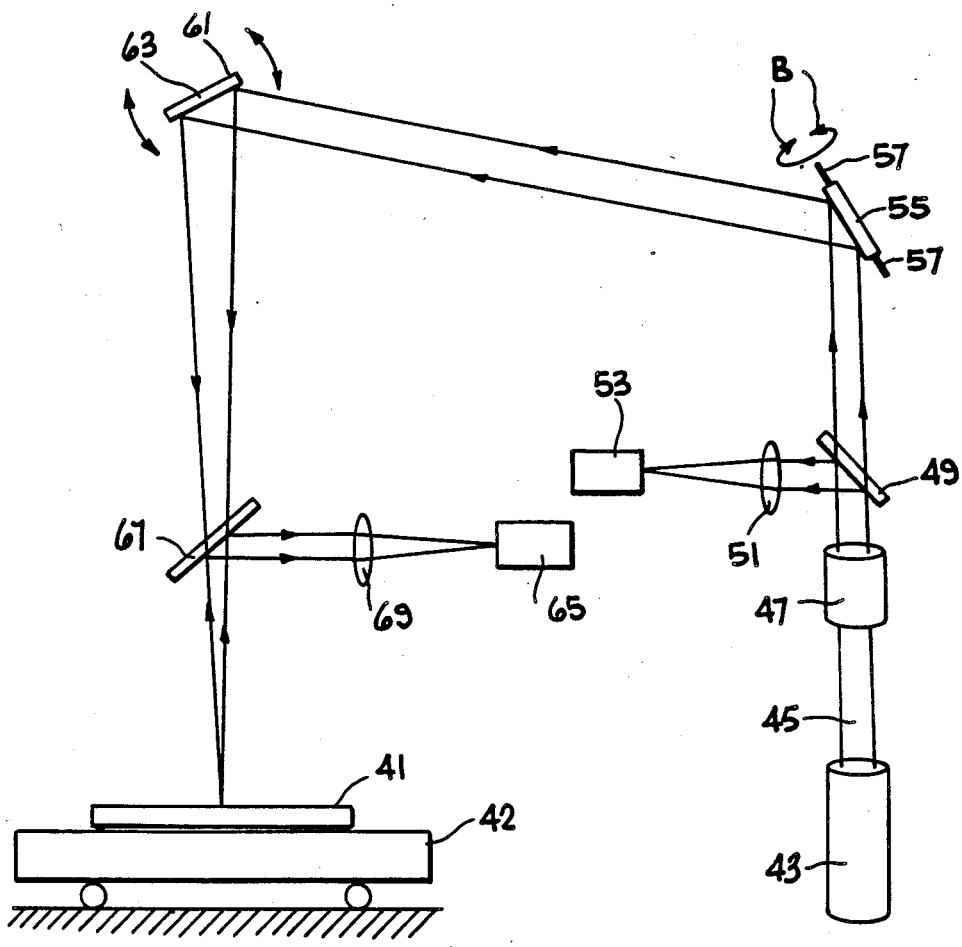
FIG. 8 is a plan view of optical apparatus for reading and writing on the data strip portion of the medium illustrated in FIG. 1.

Of course, while the photo image may be read by conventional means, low-powered laser or a photodetector array must be used to read the data strip. A laser apparatus is illustrated in FIG. 8, which illustrates the side view of the lengthwise dimension of the medium of FIG. 1 consisting of a data strip in combination with photo images. The data strip portion 41 of the medium is usually received in a movable holder 42 which brings the strip into the trajectory of a laser beam. A laser light source 43, preferably a pulsed semiconductor laser of infrared wavelength emits a beam 45 which passes through collimating and focusing optics 47. The beam is sampled by a beam splitter 49 which transmits a portion of the beam through a focusing lens 51 to a photodetector 53. The detector 53 confirms laser writing. The beam is then directed to a first servo controlled mirror 55 which is mounted for rotation along axis 57 in the direction indicated by arrows B. The purpose of the mirror 55 is to find the lateral edges of the data strip in a coarse mode of operation and then in a fine mode of operation identify data paths which exist predetermined distances from the edges.

From the mirror 55, the beam is direted toward a mirror 61. This mirror is mounted for rotation at pivot 63. The purpose of mirror 55 is for fine control of motion of the beam along the length of the data strip. Coarse control of the lengthwise portion of the data strip relative to the beam is achieved by motion of the movable holder 42. The position of the holder may be established by a linear motor adjusted by a closed loop position servo system of the type used in magnetic disk drives. Reference position information may be prerecorded on the strip so that position error signals may be generated and used as feedback in motor control. In particular, information for controlling an optical micrographic reader may be recorded. Upon reading one data path, the mirror 55 is slightly rotated. The motor moves holder 42 lengthwise so that the path can be read again, and so on. As light is scattered and reflected from spots in the laser recording material, the reflectivity of the beam changes relative to surrounding material where no spots exist. The beam should deliver sufficient laser energy to the surface of the recording material to create spots in the data writing mode, but should not cause disruption of the surface so as to cause difficulty in the data reading mode. The wavelength of the laser should be compatible with the recording material to achieve this purpose. In the read mode, power is approximately 5% to 10% of the recording or writing power.

Differences in reflectivity between a spot and surrounding material are detected by light detector 65 which may be a photodiode. Light is focused onto detector 65 by beam splitter 67 and focusing lens 69. Servo motors, not shown, control the positions of the mirrors and drive the mirrors in accord with instructions received from control circuits, as well as from feedback devices. The detector 65 produces electrical signals corresponding to spots. Other optics, not shown, could be used to observe the photo images, while data is being read or written on the data strip.

A photodetector array such as a CCD could also be used. It could be either a linear array or area array. The number of detector elements per track would be approximately three elements to create a reading redundancy. The surface would be illuminated with low-cost light-emitting diodes generating power primarily in the near infra-red to match the sensitivity spectrum of the photodetector array.

I claim:

1. A micrographic film member comprising, a micrographic image having borders surrounding the image, and a strip of reflective-read direct-read-after-write laser recording material disposed in a border, said strip having laser written indicia thereon, said indicia related to the micrographic image.

2. The film member of claim 1 wherein said indicia comprises indexing information.

3. The film member of claim 1 wherein said indicia comprises information for controlling an optical micrographic reader.

4. The film member of claim 1 wherein said indicia comprises information relating to the position of image portions within micrographic image.

5. The film member of claim 1 wherein said indicia comprises information relating to the sequencing of image portions within the micrographic image.

6. The film member of claim 1 wherein said indicia comprises eye readable alphanumeric information.

7. The film member of claim 1 wherein said indicia comprises laser written speech.

8. The film member of claim 1 wherein said indicia comprises machine readable information.

9. The film member of claim 7 wherein said laser written speech is human speech.

10. The film member of claim 7 wherein said laser written speech is phoneme speech.

* * * * *